United States Patent [19]

Echols

[11] Patent Number: 5,025,588
[45] Date of Patent: Jun. 25, 1991

[54] JIG AND FLY BOX

[76] Inventor: John B. Echols, 403 Franklin St., Natchez, Miss. 39120

[21] Appl. No.: 515,588

[22] Filed: Apr. 27, 1990

[51] Int. Cl.$^5$ .............................................. A01K 97/06
[52] U.S. Cl. .................................. 43/57.1; 206/315.11
[58] Field of Search ............................... 43/57.1, 54.1; 206/315.11, 315.1, 373, 495

[56] References Cited

U.S. PATENT DOCUMENTS

| | | | |
|---|---|---|---|
| 3,461,599 | 8/1969 | Sylvester | 206/57.1 |
| 3,997,050 | 12/1976 | Patterson | 206/566 |
| 4,286,832 | 9/1981 | Spevak | 206/373 |
| 4,324,446 | 4/1982 | LeSage | 206/45.15 |
| 4,516,707 | 5/1985 | Crapanzano | 206/315.11 |

*Primary Examiner*—Richard K. Seidel
*Assistant Examiner*—Chuck Y. Mah
*Attorney, Agent, or Firm*—Fleit, Jacobson, Cohn, Price, Holman & Stern

[57] ABSTRACT

A box or container for effeftively supporting a plurality of fishing lures including jigs and flys in a manner that the items stored in the box can be readily observed and in a manner which will retain the jigs and flys in an untangled and orderly position. The jig and fly box includes a plurality of vertically disposed supporting posts oriented internally of a box having transparent panels enclosing the posts with at least one of the transparent panels being in the form of a pivotal door to provide access to the interior of the jig and fly box. Each of the posts includes a resilient supporting member in the form of an elastic cord or line connected to the post at spaced points to provide a resilient holddown straddling the jig or fly to hold it in position on the post for easy observation and to prevent it from becoming entangled with other jigs and flys but yet enabling the jig or fly to be easily removed for use. Each of the posts is rotatably supported and is of polygonal, cross-sectional configuration to provide a plurality of faces on each post to support a plurality of vertical rows of jigs or flys.

5 Claims, 1 Drawing Sheet

JIG AND FLY BOX

BACKGROUND OF THE INVENTION

1. Field of the Invention

The present invention generally relates to a box or container for effectively supporting a plurality of fishing lures including jigs and flys in a manner that the items stored in the box can be readily observed and in a manner which will retain the jigs and flys in an untangled and orderly position. The jig and fly box includes a plurality of vertically disposed supporting posts oriented internally of a box having transparent panels enclosing the posts with at least one of the transparent panels being in the form of a pivotal door to provide access to the interior of the jig and fly box. Each of the posts includes a resilient supporting member in the form of an elastic cord or line connected to the post at spaced points to provide a resilient holddown straddling the jig or fly to hold it in position on the post for easy observation and to prevent it from becoming entangled with other jigs and flys but yet enabling the jig or fly to be easily removed for use. Each of the posts is rotatably supported and is of polygonal, cross-sectional configuration to provide a plurality of faces on each post to support a plurality of vertical rows of jigs or flys.

2. Information Disclosure Statement

Fishermen frequently carry many jigs, flys and other types of lures in a container. Frequently, such containers include a rectangular box having a pivotal lid and a plurality of trays which can fold out or in some cases lift out. When a plurality of fishing lures, jigs or flys are placed in conventional storage boxes, they become entangled and cannot be easily observed nor can they be easily picked out of a tangled mass of lures. The following U.S. patents relate to devices for supporting fishing lures such as jigs, flys and the like.

U.S. Pat. Nos. 3,481,066
3,997,050
4,040,202
4,058,356
4,577,433

None of the above patents disclose a structure equivalent to the structure of the present invention.

SUMMARY OF THE INVENTION

An object of the present invention is to provide a jig and fly box having a peripheral wall surface defining an upright container or box in which the wall surface includes transparent areas to enable the interior of the box to be observed. A plurality of supporting posts are mounted in the interior of the box with each post supporting a plurality of jigs or flys thereon in vertically spaced relation to enable easy observation of the jigs or flys and enable easy access to the jigs or flys to enable them to be readily obtained by a fisherman and placed on a fishing line in a well-known manner and easily returned to a storage area on the post when the jig or fly is no longer being used.

Another object of the invention is to provide a jig and fly box having a plurality of rotatable posts with each post being of square configuration and each face of the post has an elongated elastic cord secured thereto at spaced intervals to provide a plurality of resilient holddowns for supporting a plurality of jigs or flys in vertically spaced relation on each face of the post.

A further object of the invention is to provide a jig and fly box in accordance with the preceding objects in which the vertically disposed posts are rotatable and oriented in transverse alignment and the wall surface of the box includes a front wall having a pair of pivotally supported transparent doors forming a closure extending substantially completely across the front of the box to enable all of the posts and the jigs and flys mounted thereon to be easily observed and obtained by a person desiring one of the jigs or flys.

These together with other objects and advantage which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
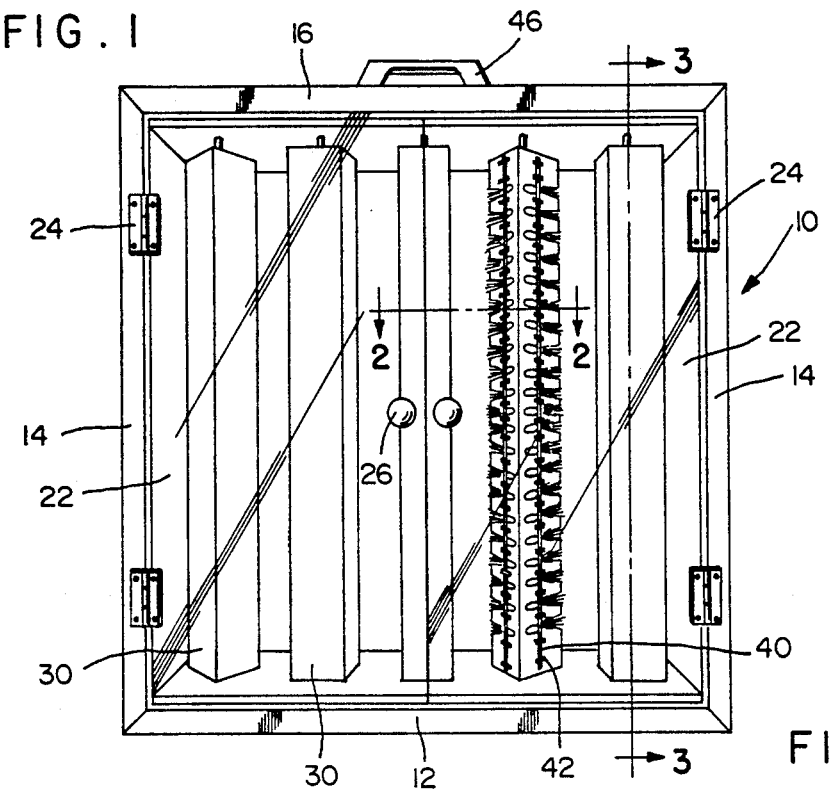
FIG. 1 is a front, perspective view of the jig and fly box of the present invention.
Figure 2:
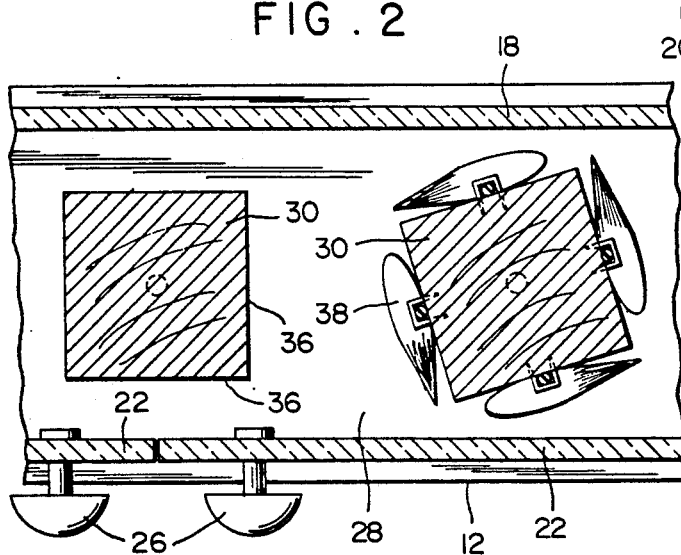
FIG. 2 is a transverse, plan sectional view taken substantially upon a plane passing along section line 2—2 on FIG. 1 illustrating the structure of the rotatable posts and other components of the invention on an enlarged scale.

Referring now specifically to the drawings, the jig and fly box of the present invention is generally designated by reference numeral 10 and is in the form of a square or rectangular upright container which includes a generally horizontally disposed bottom wall 12, upwardly extending side walls 14 which are parallel to each other and perpendicular to the bottom wall and a top wall 16 interconnecting the upper ends of the side walls 14 thus forming an open rectangular container which may be square or elongated depending upon the needs of individual users. The container or box 10 also includes an imperforate, stationary rear wall 18 which may be of transparent material. The peripheral edges of the rear wall 18 may be received in grooves 20 formed in the bottom wall 12, side walls 14 and top wall 16. The front of the container or box 10 is closed by a pair of pivotal doors 22 constructed of transparent material with the outer side edges of the doors 22 being hingedly connected to the side walls 14 by hinge structures 24. The inner edges of the doors are disposed closely adjacent each other when in closed position as illustrated in FIG. 2 and include an outwardly projecting knob 26 by which the doors can be opened and closed. A latch structure such as a detent or a magnetic latch structure may be provided to retain the doors in closed position against an edge of the bottom wall 12 and the top wall 16 with the relationship of the doors 22 to the bottom and top walls being illustrated in FIG. 3.

Figure 3:
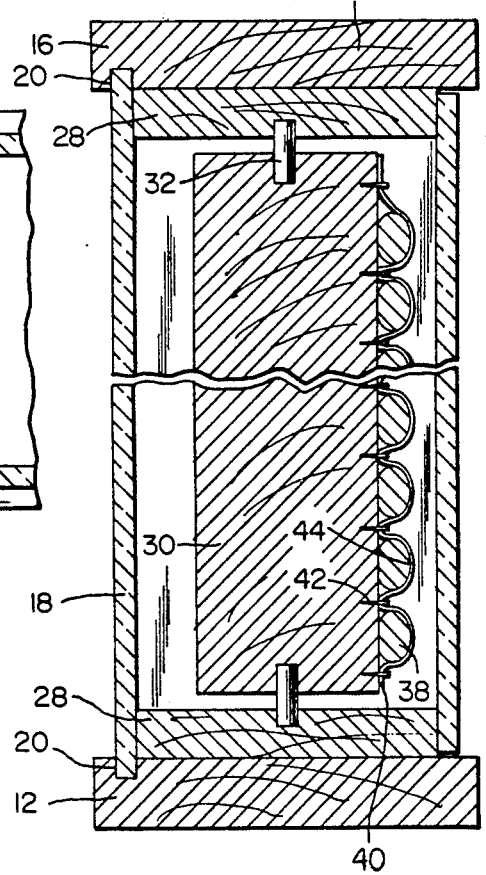
FIG. 3 is a vertical, sectional view taken substantially upon a plane passing along section line 3—3 on FIG. 1 illustrating further structural details of the box and rotatable post on an enlarged scale.

Mounted internally of each of the top wall 16 and bottom wall 12 is an inner wall 28 which forms a front edge of the top and bottom wall engaged by the door 22 and also engages the inner surface of the rear wall 18 as illustrated in FIG. 3.

A plurality of vertically disposed posts 30 are mounted in parallel relation interiorly of the box 10 with each post including a projecting pin or dowel 32 received in a socket 34 formed in the inner walls 28.

Thus, the inner walls 28 may be assembled in relation to the pivot pins 32 then inserted into the container and secured in place against the top and bottom walls, respectively, thus enabling assembly of the posts. Each of the posts 30 is of square, cross-sectional configuration and provided with four flat faces 36. The faces 36 of the posts 30 include a plurality of fishing lures in the form of jigs or flys 38 mounted thereon in vertically spaced relation. The mounting structure for the jigs or flys includes an elongated elastic cord 40 secured to the face 36 at vertically spaced points by staples 42 thus forming a plurality of short elastic cord segments 44 which receive a fishing lure thereunder as illustrated in the drawings. The elastic cord segments ca be stretched sufficiently to insert the jig or fly 38 under the cord segment and the cord segment released so that the resiliency of the cord will retain the jig or fly in place on the face 36. This structure enables a plurality of jigs or flys to be mounted in vertically spaced relation and in a secure manner on each face 36 of each post 30. Thus, by rotating the posts, all of the jigs or flys thereon can be rotated to a forward observable position adjacent the open front of the box 10 since the doors 22 will be open to enable rotation of the posts. The transparent doors 22 as well as the transparent rear wall 18 enable observation of the various lures from both the front and rear of the box and, if desired, the uppermost pins may extend through the top wall and be provided with a knob for rotation thereof without opening the doors. This structure enables a plurality of jigs or flys 38 to be securely stored in a vertically spaced manner in a vertical row on each face of the posts with the posts being rotatable to enable all of the jigs or flys to be observed and enabling easy access to each of the jigs or flys by opening the doors and rotating the posts to a desired position so that the desired jig or fly is accessible.

The top wall 16 is provided with a loop-type handle 46 thereon to enable the jig and fly box to be carried to a desired location. Also, a light feature may be incorporated into the device for illumination if desired although this is usually not necessary.

The jig and fly box of the present invention may be constructed of conventional materials with the peripheral walls being of wood or similar material provided with any desired finish including plastic laminated thereto having any decorative features desired. The transparent doors and rear wall may be constructed of glass or plastic having characteristics which resist breakage. The posts 30 are preferably constructed of wood and may be of other polygonal shapes in which a plurality of faces are provided and in some instances may be constructed in fixed relation to the top and bottom walls. The doors include conventional hardware including hinges, knobs and latch structures to retain them in closed position with the doors providing easy access to the jigs and flys and the doors and rear wall providing easy observation of the flys to enable a desired jig or fly to be selected. The resilient cords holding the jigs and flys securely retain them in spaced relation to prevent the jigs and flys from becoming entangled with each other thereby enabling a fisherman to easily select a jig or fly and remove it from the box and connect it to his fishing rig in a well-known manner.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A jig and fly box comprising a bottom wall, upstanding parallel side walls and a top wall joined together to define a rigid peripheral wall, a rear wall connected to the peripheral wall and forming a closure for the rear of the box, access door means connected to the peripheral wall and providing access to the interior of the box, a plurality of vertically disposed posts mounted between the bottom and top walls of the box, each of the posts including a vertically disposed face, means on each face securing a plurality of jigs and flys releasably thereto in vertically spaced relation, said access door means and rear wall being transparent to enable observation and selection of a jig or fly, each of said posts having a square cross-sectional configuration defining four vertically disposed faces, each of said faces of each post including means supporting a plurality of jigs and flys, said means on each face of each post to support a plurality of jigs and flys including an elongated elastic cord, means securing the cord to the face of the posts at vertically spaced points thereby providing a plurality of elastic cord segments which can be stretched outwardly to enable insertion and removal of a jig or fly with the cord holding the jig or fly in place when released, and means interconnecting each of the posts and the top and bottom walls to enable rotational movement of the posts to enable all of the faces of the posts to be moved to an observable position, said access door means including a pair of pivotal, transparent panels having hinge means connecting the outer edges thereof to the upstanding side walls, knob means on the inner adjacent edges of the doors to enable manipulation thereof.

2. A jig and fly box comprising a generally rectangular bottom wall, a pair of generally rectangular side walls connected to the ends of the bottom wall and extending upwardly therefrom in parallel relation, a generally rectangular top wall interconnecting the upper end of the side walls in parallel relation to the bottom wall to define a rigid peripheral wall, a rear wall connected to the rear edge of the peripheral wall and forming a closure for the rear of the box, the front of the box including pivotal door means forming a closure for the front of the box and enabling access to the interior of the box, at least one vertically disposed post in said box and extending between the bottom wall and top wall, means at the bottom end of the post to rotatably support the post from the bottom wall, means at the top end of the post to rotatably support the post from the top wall, said post being of polygonal cross-sectional configuration and including a plurality of longitudinally continuous flat faces forming the periphery of the post, each face of said post including means thereon to support a plurality of jigs and flys in spaced relation, one of said rear wall and pivotal door means including a transparent area to enable observation of the jigs and flys on each face of said post, said pivotal door means being openable to rotate the post to enable observation of all the jigs and flys and enable access to all the jigs and flys for use.

3. The box as defined in claim 2 wherein said means on each face of the post to support jigs and flys includes an elongated elastic cord extending longitudinally along the center of the post from end to end, means securing the elastic cord to the face of the post at longitudinally spaced points to form a plurality of elastic cord segments with each segment adapted to hold a jig or fly against the face of the post.

4. The box as defined in claim 3 wherein said transparent area is a transparent panel forming said pivotal door means and extending substantially the full length of the post to enable observation of and access to all of the jigs and flys.

5. The box as defined in claim 4 wherein said access door means includes two generally rectangular transparent panels hinged at their outer edges to said side walls, handle means on each of said panels to enable opening and closing manipulation thereof, said post being square in cross-sectional configuration and provided with four equal sized flat faces to enable one face of the post to be oriented in parallel relation to the transparent panels, and a plurality of additional and identical posts rotatably supported in parallel relation in the box to provide a plurality flat faces facing the panels for observation when the panels are closed and access to the jigs and flys when the panels are opened.

* * * * *